United States Patent [19]
Bice

[11] 3,845,833
[45] Nov. 5, 1974

[54] TRACTOR SUSPENSION

[75] Inventor: William A. Bice, Lubbock, Tex.

[73] Assignee: Clark Equipment Company, Buchanan, Mich.

[22] Filed: Nov. 9, 1973

[21] Appl. No.: 441,696

Related U.S. Application Data

[63] Continuation of Ser. No. 304,433, Nov. 7, 1972, abandoned.

[52] U.S. Cl..................... 180/29, 180/71, 280/65
[51] Int. Cl.............................................. B60g 9/02
[58] Field of Search........ 180/29, 71, 73 R; 280/65, 280/79

[56] References Cited
UNITED STATES PATENTS

| | | | |
|---|---|---|---|
| 3,032,133 | 5/1962 | Brown | 180/71 X |
| 3,118,686 | 1/1964 | McAdams | 280/65 |
| 3,664,452 | 5/1972 | Schaeff | 180/71 |

*Primary Examiner*—David Schonberg
*Assistant Examiner*—T. L. Siemens
*Attorney, Agent, or Firm*—Jack E. Toliver

[57] ABSTRACT

A tractor suspension, especially for a two-wheeled, overhung tractor for pulling a two-wheeled scraper, having a pair of suspension arms pivotally mounted at the rear ends and extending forwardly in horizontal relation to the tractor frame side rails. A drive axle is carried at its opposite ends on the forward ends of the suspension arms. A pair of ride cylinders, one on each side, is pivotally mounted at the upper and lower ends thereof inboard of the frame side rails and extends above the side rails over the drive axle to absorb deflections of the drive axle.

10 Claims, 3 Drawing Figures

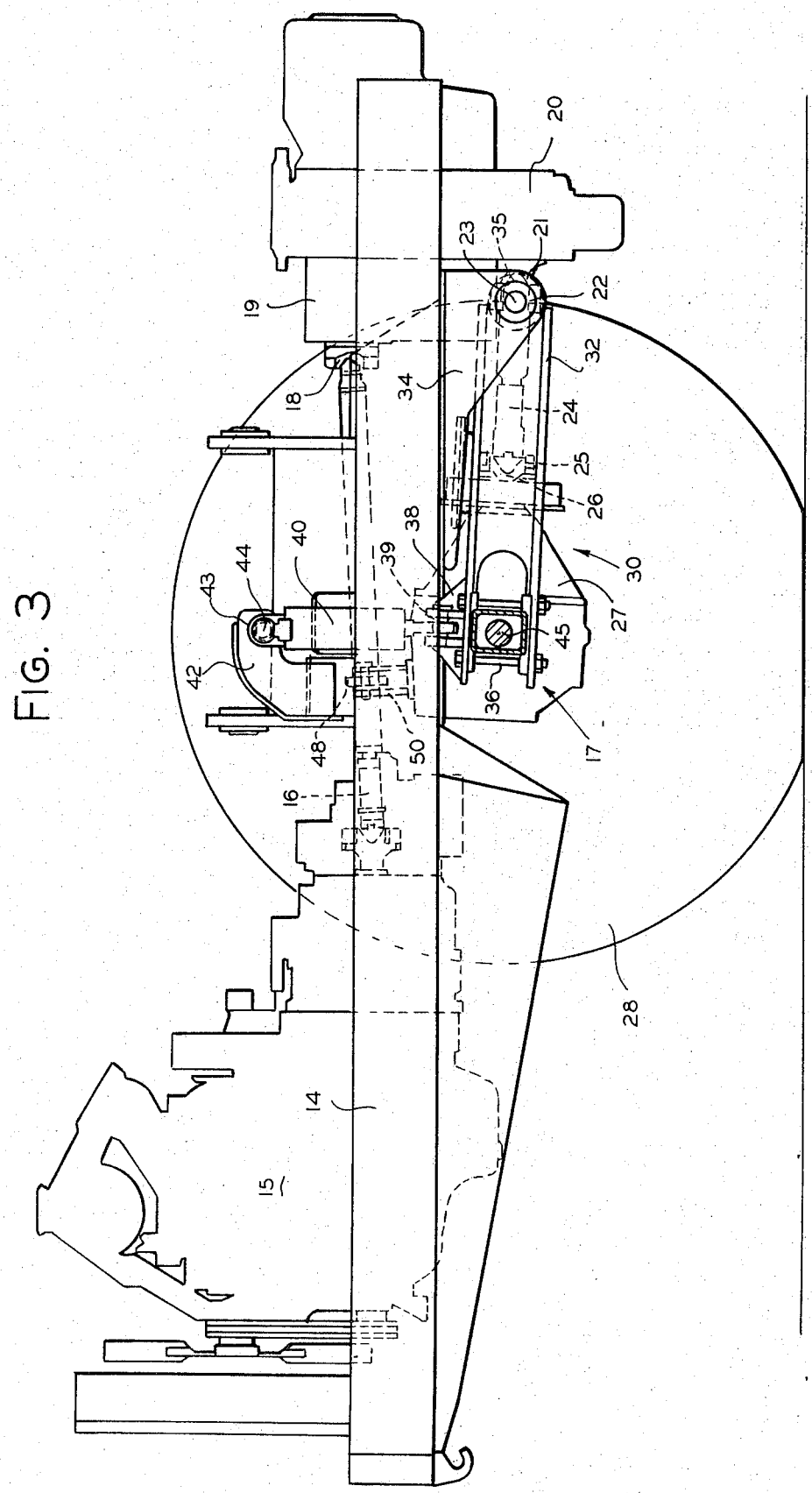

TRACTOR SUSPENSION

This is a continuation, Ser. No. 304,433, filed 7 Nov. 1972 now abandoned.

BACKGROUND OF THE INVENTION

1. Field of the Invention

The invention pertains to the art of vehicle suspension systems and more particularly to two-wheeled tractor suspensions for off-highway, earth-moving machines such as an articulated tractor scraper.

2. Description of the Prior Art

The type of vehicle to which the suspension of the present invention must directly applies and will find its greatest utilization is an articulated tractor scraper in which there is a two-wheeled tractor which tows a two-wheeled scraper, neither of which is capable of independent level support. The two are interconnected by a yoke attached to the scraper and pivotally mounted on the tractor by kingpin coupling. Some tractor suspensions use a pair of hydraulic ride cylinders mounted between the axle and tractor frame. The hydraulic cylinders are connected to an accumulator that acts as a spring so that the hydraulic fluid may flow from the cylinders against the accumulator pressure damping out vibrations and shocks. Flow control devices are provided in the hydraulic circuit for controlling the flow from and to the cylinders. Such a suspension is disclosed in the U.S. Pat. No. 3,118,686, issued Jan. 21, 1964, entitled "Bounce Retarding Vehicle Suspension" assigned to the assignee of the present invention.

While the suspension system described in the aforementioned patent is in commercial use and is successfully used on tractor scrapers, particularly the larger capacity scrapers in excess of 18 cubic yards, tractors for scrapers of smaller size are more compact and the suspension designed for the larger tractors does not have room to fit between the frame, drive axle, wheels and driveline components.

Moreover, in a suspension as described in the aforementioned patent, the suspension arms extend rearwardly beneath the side rails beyond the drive axle and the hydraulic ride cylinders are pivotally mounted at the trailing ends of the suspension arms. The relatively long suspension arms produce a large deflection arc. Accordingly upon full extension of the ride cylinders, the angle of the drive axle sometimes exceeds the maximum operating angle permitted of the driveline causing excessive driveline wear and maintenance.

SUMMARY OF THE INVENTION

Mindful of these and other problems a tractor suspension is provided where the suspension arms are pivotally mounted to the frame side rails behind the drive axle and extend forwardly to the axle. A pair of ride cylinders, one on each side, is pivotally mounted between the axle and frame such that each cylinder is mounted above the drive axle and extends above the frame. As a result a more compact arrangement of the drive axle and driveline components is achieved without sacrificing stability or ride smoothness.

Where the tractor has a transfer case extending below the frame to which the driveline connects, the rear ends of the suspension arms are in substantial alignment with the horizontal transverse pivot axis of the universal coupling between the driveline and transfer case. Thus the deflection arc of the drive axle, even with full extension and retraction of the ride cylinders, will now exceed the permissible angle of the driveline.

One of the principal advantages of the present suspension is that a more compact arrangement of driveline and drive axle components is possible without sacrificing access serviceability, stability or ride smoothness and with less weight than prior art hydraulic suspensions.

Another advantage is that with the ride cylinders fully extended, the driveline does not pass its point of maximum operating angle, thus prolonging driveline life.

These and other advantages will be more apparent by referring to the following detailed description of the preferred embodiment which proceeds with a description of the drawings wherein

DESCRIPTION OF THE DRAWINGS

FIG. 3 is a partial side elevational view of the tractor main frame looking along the lateral center line of the drive axle showing the suspension and arrangement of driveline components.

DESCRIPTION OF THE PREFERRED EMBODIMENT

Figure 1:
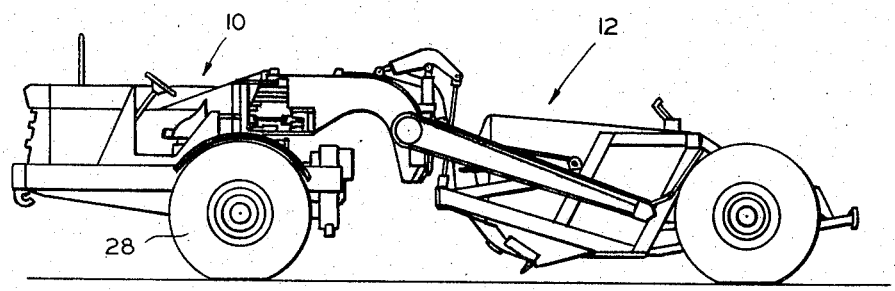
FIG. 1 is a side elevational view of a tractor scraper of a type which may advantageously employ the tractor suspension according to the present invention.

FIG. 1 shows a two-wheeled, over-hung tractor 10 towing a two-wheeled scraper 12 which may be considered illustrative of one type of vehicle to which the present suspension system may find particular utility, however, it should be appreciated that the suspension is not limited to tractor scrapers and will find important application to off-highway, rubber-tired construction vehicles generally. The ride characteristics of tractor scrapers have been a subject of considerable study in the past and tractor suspensions have been developed, such as disclosed in the aforementioned patent, which largely eliminate the "loping" problem encountered with such vehicles. Those familiar with scrapers will recognize that under certain conditions when the scraper is carrying a heavy load, the entire vehicle may go into a rhythemic bouncing action in which the load-carrying portion of the vehicle, namely the scraper and also the portion on which the operator rides, namely the tractor, oscillates up and down or lopes. Loping occurs most frequently when the vehicle is travelling over rough terrain under loaded conditions, however, it may be also set in motion when unloaded by the tractor striking a sharp bump.

It is also considered desirable to have the tractor suspension compensate for loaded and unloaded conditions for better control of the scraper cutting edge during loading, spreading and grading by employing controlled, variable length, hydraulic ride cylinders. The ride cylinders are connected to an accumulator. An hydraulic pump supplies pressure to vary the length of the ride cylinders in response to the load on the scraper so as to maintain an acceptable amplitude of the drive axle and a relatively uniform spacing of the drive axle and frame. An accumulator and variable length ride cylinder suspension system of the type referred to is disclosed in U.S. Pat. No. 3,549,168, entitled "Suspension System for a Vehicle" issued Dec. 22, 1970 and assigned to the assignee of the present invention. Such a system is utilized in conjunction with the present suspension and the disclosure of U.S. Pat. No. 3,549,168 is incorporated by reference herein, attention being directed specifically to FIG. 3 in the said patent showing the hydraulic circuit and FIG. 4 showing the ride cylinders together with the description thereof and its operation found in the specification commencing at column 2, line 4 and ending at column 3, line 50.

Figure 2:
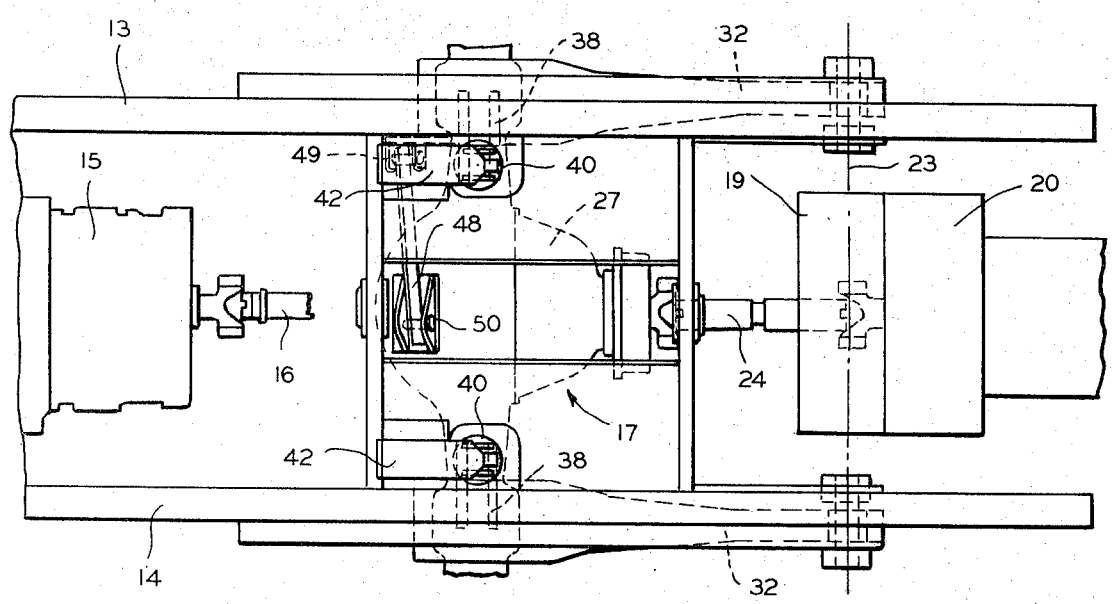
FIG. 2 is a partial plan view of the tractor main frame showing the mounting location of the drive axle, suspension arms and driveline components in relationship to each other and the frame.

Referring now to FIGS. 2 and 3, the tractor main frame includes a pair of longitudinally extending, laterally spaced apart, frame side rails 13, 14. A tractor engine 15 is mounted between the rails 13, 14 at the front and delivers torque through a driveline 16 extending rearwardly above a drive axle 17 to a transfer case 19. A drop box 20 of the transfer case extends below the side rails 13, 14. An output shaft 21 delivers torque from the drop box 20 to a universal coupling 22 having a laterally extending horizontal pivot axis 23. Coupling 22 is connected to a counter shaft 24 which extends forwardly and connects at its front end to a universal coupling 25 on the input shaft 26 of the tractor differential contained in the differential housing 27 of the drive axle 17. The body of the tractor and the chassis, including the engine and drive components, as well as that portion of the scraper load carried by the tractor constitutes the sprung mass which is carried by the suspension 30.

The suspension 30 comprises a pair of longitudinally extending suspension arms 32 pivotally mounted below the side rails 13, 14 behind the drive axle 17 on brackets 34 depending from the side rails 13, 14. It is important to note that the bushings 35 at the lower ends of the brackets pivotally mount the rear ends of the suspension arms 32 in alignment with the transverse, horizontal pivot axis 23 of the universal coupling 22. The suspension arms 32 extend forwardly to the drive axle 17 in general horizontal relationship with the side rails 13, 14. At their forward ends, an axle clamping assembly 36 is provided through which the opposite ends of the drive axle 17 extend. The clamping assembly 36 includes a laterally extending bracket 38 on each side projecting inboard of the side rails 13, 14 and providing lower pivotal connections 39 for a pair of ride cylinders 40. The ride cylinders 40 will have a construction of the type referred in the aforementioned U.S. Pat. No. 3,549,168 and be connected to an accumulator and hydraulic pump as already mentioned. A pair of frame brackets 42 project upwardly, one on each side, inboard of the side frame rails 13, 14 and extend rearwardly at the top to provide a pair of sockets 43 above the lower pivotal connections 39. The sockets 43 receive the upper ends of the ride cylinders 40 having a ball 44 by which slight misalignment is permissible between the upper and lower connections. It is also important to note that the ride cylinders 40 extend above the side frame rails 13, 14 and act on a line passing approximately through the lateral center line 45 of the drive axle. A lateral stabilizer bar 48 is pivotally connected on one end to the side rail 13 at 49 and extends laterally inwardly above the differential housing where it is pivotally connected at the top of the housing by a bracket 50.

Due to the lack of clearance to the rear of the drive axle 17, between the tractor wheels 28 and main frame and between the bottom of the side rails 13, 14 and the top of the drive axle, the ride cylinders 40 could not be located between the ends of the suspension arms and the underside of the rails 13, 14 such as has been done with the larger size tractors. In addition, the oscillations of the drive axle in the prior art suspensions would cause the driveline to swing in an arc greater than that permissible for the universal coupling in the driveline for the smaller tractor.

Primarily with these difficulties in mind, attention is directed to the present suspension 30 where it will be noted that the suspension arms 32 are pivotally connected to the frame side rails 13, 14 to the rear of the drive axle 17 and on the lateral horizontal pivot axis of the universal coupling 22. As a result oscillations of the drive axle 17 are on a radius at the point of the oscillations of the countershaft 24 such that the angular motion at the coupling 22 is no greater than would be the case for the countershaft alone.

It should also be observed that the suspension arms 32 extend in close, horizontal relationship to the side rails 13, 14 giving the tractor chassis a low slung, compact stance. This is due to the fact that the ride cylinders 40 extend above the frame rail 13, 14 rather than being pivoted at the under side of the rails as in the prior art. Moveover, as mentioned above, the ride cylinders act directly above the drive axle and at the ends of the suspension arms. As a result better stability and smoother ride characteristics are obtained.

Having thus described a preferred embodiment of the present invention, it will, of course, be understood that various changes may be made in the form, details, arrangement and proportion of the parts without departing from the scope of the invention which consists of the matter shown and described herein and set forth in the appended claims.

I claim:

1. A suspension for a two-wheeled tractor having a frame, a pair of spacedapart, longitudinally extending frame side rails, a drive axle extending transversely of the frame side rails, said suspension connected between the drive axle and vehicle frame and comprising a pair of brackets depending from the frame side rails behind the drive axle, a pair of suspension arms pivotally connected to said brackets and extending forwardly therefrom beneath the respective frame side rails, a pair of arm brackets solidly mounted on the suspension arms at the front supporting opposite ends of said drive axle, each having a laterally extending portion inboard of the frame side rails, a pair of frame brackets solidly mounted on a portion of the frame extending above the frame side rails and having an upper end portion located substantially directly above the lateral end portions of said arm brackets, a pair of ride cylinders pivotally mounted between the bracket portions such that the lower ends of each ride cylinder are pivotally mounted substantially directly above the drive axle adjacent the frame side rails and extend upwardly above the frame side rails whereby the drive axle, suspension arms and frame side rails are in a more compact relation.

2. A suspension according to claim 1 wherein stabilizer means includes a laterally extending bar pivotally attached at one end to the frame and at the other end to the drive axle at a point approximately midway between the frame side rails whereby side movement of the drive axle is prevented.

3. A suspension according to claim 2 where the lower mounting location for the ride cylinders is above the lateral center line of the drive axle and at the ends of the suspension arms offset inside of the frame side rails.

4. In a vehicle having a frame, a pair of spaced-apart, longitudinally extending frame side rails, an engine mounted between the frame side rails toward the front thereof, a drive line member medially between said frame side rails extending rearwardly from the engine, a transfer case having an input shaft connected to the driveline member, an output shaft driven by the transfer case extending forwardly below the frame side rails, a universal coupling on the output shaft, a second driveline member connected to the universal coupling extending forwardly in substantially horizontal relationship to the frame side rails, a drive axle extending transversely of the frame side rails having wheels at each end supporting the vehicle on the ground and a differential housing of the axle supported medially between the frame side rails having a differential input shaft extending rearwardly and connected to the forward end of the second driveline member, the improvement comprising a suspension mounted between said drive axle and frame including a pair of brackets, one on each side, depending from the frame side rails having bushings transversely aligned with the horizontal pivot axis of the universal coupling, a pair of arms pivotally mounted at one end on the bushings and extending forwardly therefrom beneath the respective frame side rails in horizontally disposed relation mounting the axle at the opposite end, a pair of brackets, one on each arm, solidly mounted at the forward ends thereof and having laterally extending portions inboard of the frame side rails, a pair of frame brackets, one on each side, solidly mounted on a portion of the frame and extending above the frame side rails having upper end portions located substantially vertically above the lateral end portions of said arm brackets and a pair of ride cylinders mounted between said bracket portions on the inboard side of the frame side rails.

5. The improvement according to claim 4 wherein said bracket portions for mounting the ride cylinder are substantially aligned in a transversely extending vertical plane through the drive axle.

6. The improvement according to claim 5 wherein the upper end portion of said frame brackets provide a spherical socket portion and the upper end of said ride cylinders has a spherical bearing received in said socket portion whereby slight misalignment of the ride cylinder is possible between the upper and lower cylinder connections.

7. A suspension for a two-wheeled tractor having a frame and a drive axle extending transversely of the frame, said suspension connected between the drive axle and the frame and comprising a pair of spaced apart longitudinally extending suspension members pivotally mounted on a substantially horizontal transverse axis at one end and extending forwardly with respect to the vehicle secured to the drive axle at the opposite end, a pair of ride cylinders, one on each side, pivotally connected at their lower ends to the axle and extending upwardly above the axle secured at their opposite ends above the bottom of the frame.

8. A suspension for a two-wheeled tractor according to claim 7 including a pair of frame mountings solidly secured to a portion of the frame and extending laterally inwardly above the plane of the axle for mounting the upper end of the ride cylinders and a pair of axle mounts solidly secured to the axle at spaced apart locations generally below the frame mounts for pivotally securing the lower ends of the ride cylinders.

9. A suspension according to claim 8 wherein the axle mount for the lower ends of the ride cylinders is offset laterally inwardly with respect to the connection of the suspension members with the axle by an amount sufficient to permit vertical clearance between the ride cylinders and the frame.

10. A suspension according to claim 9 wherein the frame includes a pair of spaced apart, longitudinally extending frame elements and the suspension arms extend generally horizontally closely adjacent the underneath side of said elements.

* * * * *